W. N. KYLE.
Drag-Saw Machine.
No. 222,057. Patented Nov. 25, 1879.
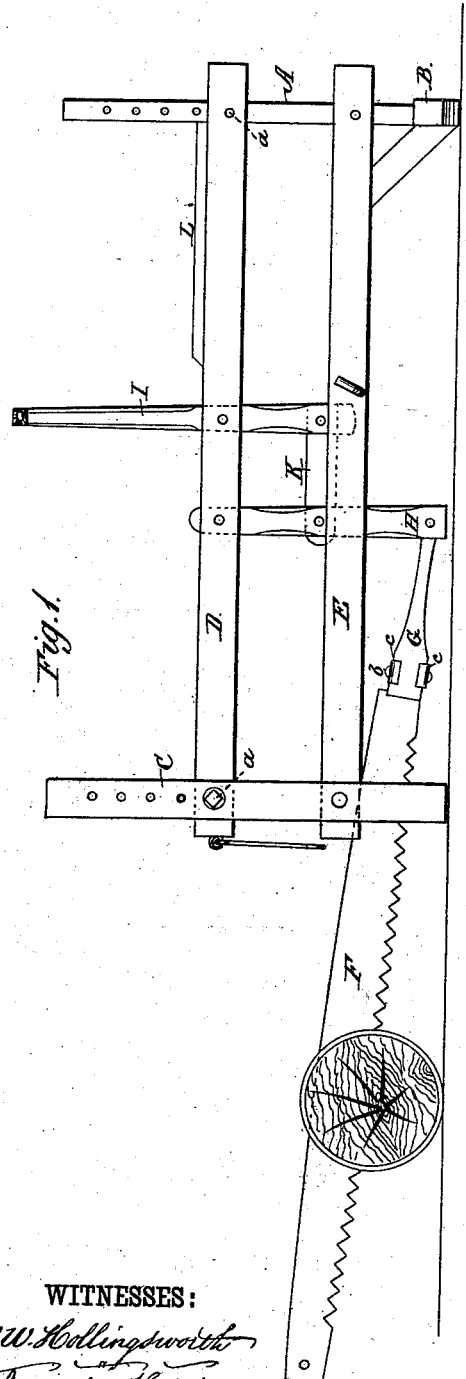
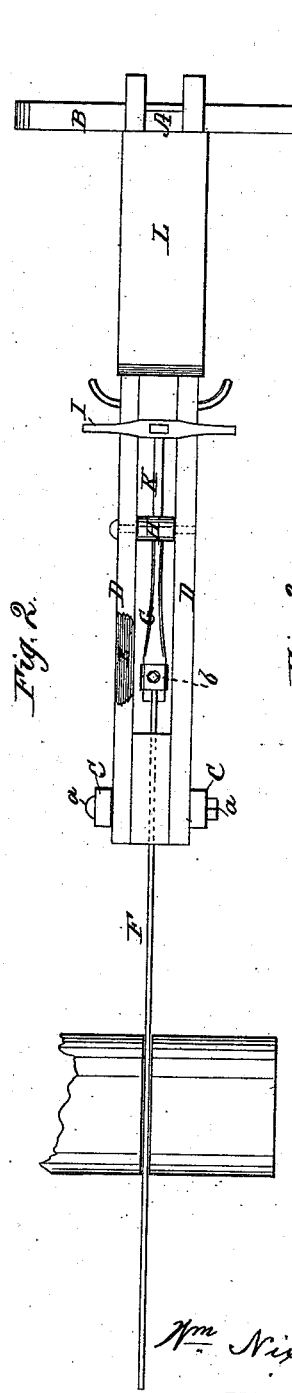
WITNESSES:
W. W. Hollingsworth
Amos W. Hart
INVENTOR:
Wm Nixon Kyle
BY
ATTORNEYS.

UNITED STATES PATENT OFFICE.

WILLIAM N. KYLE, OF EDINBURG, INDIANA.

IMPROVEMENT IN DRAG-SAW MACHINES.

Specification forming part of Letters Patent No. 222,057, dated November 25, 1879; application filed October 14, 1879.

*To all whom it may concern:*

Be it known that I, WILLIAM NIXON KYLE, of Edinburg, in the county of Johnson and State of Indiana, have invented a new and useful Improvement in Drag-Saw Machines; and I do hereby declare that the following is a full, clear, and exact description of the same.

My invention is an improvement in that class of drag-saw machines in which the saw is attached to a lever that is pivoted in a frame and vibrated by a hand-lever, also pivoted in the same frame.

My improvement relates to the construction and arrangement of parts, as hereinafter described and claimed.

In accompanying drawings, forming part of this specification, Figure 1 is a side view of my improved machine. Fig. 2 is a plan view. Fig. 3 is a detail plan view.

The saw-frame consists of the single standard A, supported by foot B, the pair of parallel standards or uprights C C, and the two sets of horizontal bars D D and E E, between which the levers for working the saw are arranged and pivoted, as hereinafter described.

The upper set of bars, D D, are adjustable vertically, being secured to the standards A C C by means of detachable screw clamping-bolts a, and the upper portion of the standards being provided with a series of transverse perforations to receive said bolts.

The single standard A is placed between the ends of the bars D and E, while the other standards, C C, are attached to the outer sides thereof.

A brace is suitably applied, as shown. The saw F is attached to the arm G, which is pivoted to the lower end of the lever H, and the latter is pivoted between the upper set of bars, D D, and swings free between the lower bars, E E.

The hand-lever I, for operating the saw, is pivoted, near its middle, between bars D D, at a point near the fulcrum of lever H, and its lower end is connected with the middle of the latter by means of a link or bar, K. By vibrating the hand-lever I a like movement is imparted to the lever H, and the saw F thereby reciprocated.

The operator sits on the seat L, which is placed on the bars D contiguous to the standard A, so that the local relation between the seat and hand-lever I remains the same in any adjustment of said bars. Such adjustment is made for the purpose of adapting the saw to work at different heights on logs of different sizes or thicknesses.

In working the saw the operator, being poised on the seat L, sways his body forward and back in the general direction of the movement of the saw F, and is thus enabled to operate the latter much more easily than if he depended mainly upon the use of his arms alone, as is necessarily the case in those machines in which the operator stands upon the ground.

The saw F is secured to the bar or pitman K by means of a bolt, $b$, and flanged washers or clamp-plates $c$. The said bolt $b$ passes through the pitman and through the socket formed on the head of the saw F, which socket is inserted in a cavity in the end of the pitman. One of the flanged plates $c$ is applied on the upper side and the other on the under side of the pitman.

What I claim is—

1. In a drag-saw machine, the combination of the set of parallel bars D D, having seat L attached thereto, and the detachable bolts $a$, with the two parallel standards C C and standard A, having perforations, as specified, and the lower set of bars, E E, which have a fixed attachment to the standards, all as shown and described.

2. In a drag-saw machine, the combination, with the adjustable set of bars D D and the standards A C, of the saw and its operating-levers H I, which are pivoted to said bars, and thereby made adjustable therewith independently of the other rigidly-connected parts E E and A C of the frame of the machine, all as shown and described.

WILLIAM NIXON KYLE.

Witnesses:
M. C. TILFORD,
J. H. SNAPP.